US009586222B2

(12) United States Patent
Maas et al.

(10) Patent No.: US 9,586,222 B2
(45) **Date of Patent: *Mar. 7, 2017**

(54) PRECOMPRESSION SYSTEM FOR A LIQUID DISPENSING DEVICE AND METHOD OF ASSEMBLING SUCH PRECOMPRESSED SYSTEM

(75) Inventors: Wilhelmus Johannes Joseph Maas, KV Someren (NL); Petrus Lambertus Wilhelmus Hurkmans, NR Someren (NL)

(73) Assignee: AFA Polytek B.V., Helmond (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,444

(22) Filed: Aug. 2, 2012

(65) Prior Publication Data

US 2012/0305119 A1 Dec. 6, 2012

Related U.S. Application Data

(63) Continuation of application No. 11/743,554, filed on May 2, 2007, now Pat. No. 8,256,648.

(30) Foreign Application Priority Data

Mar. 24, 2007 (EP) .................................... 07006107

(51) Int. Cl.
*F16K 15/14* (2006.01)
*B05B 11/00* (2006.01)

(52) U.S. Cl.
CPC ....... *B05B 11/0062* (2013.01); *B05B 11/3011* (2013.01); *B05B 11/3045* (2013.01);
(Continued)

(58) Field of Classification Search
CPC ............ B05B 11/3011; B05B 11/3045; B05B 11/3057; B05B 11/0062; B05B 11/3064; B05B 11/3069; Y10T 137/7879
(Continued)

(56) References Cited

U.S. PATENT DOCUMENTS 3,387,789 A * 6/1968 Fedit al. ........................ 239/333
4,191,313 A * 3/1980 Blake et al. .................. 222/335
(Continued)

FOREIGN PATENT DOCUMENTS

EP 0627583 A2 12/1994
GB 849386 A2 9/1960
(Continued)

*Primary Examiner* — Kevin P Shaver
*Assistant Examiner* — Robert Nichols, II
(74) *Attorney, Agent, or Firm* — Kramer Levin Naftalis & Frankel LLP

(57) ABSTRACT

A precompression system for a liquid dispensing device is presented, that prevents liquid from being discharged until a predetermined pressure has been built up. The system comprises a pump for drawing liquid through an inlet and discharging it through an outlet, and a precompression valve disposed between the pump and the outlet. The valve allows liquid in the pump to reach the outlet once the predetermined pressure is established, and stops liquid from reaching the outlet once the pressure falls below it. The precompression valve comprises an elastic diaphragm normally closing the valve opening, with a concave surface facing the valve opening and in fluid communication with the pump and a convex surface in fluid communication with atmospheric pressure. The diaphragm may be stretched around a valve seat. Methods of assembling such a precompression system in a dispensing device are also presented.

16 Claims, 6 Drawing Sheets

(52) U.S. Cl.
CPC ...... *B05B 11/3064* (2013.01); *B05B 11/3069* (2013.01); *Y10T 137/7879* (2015.04)

(58) Field of Classification Search
USPC .......... 222/383.1, 340–341, 321.7, 380–381, 222/491, 494; 239/333; 137/859, 843, 137/852–853
See application file for complete search history.

(56) References Cited

U.S. PATENT DOCUMENTS

| | | | | |
|---|---|---|---|---|
| 4,489,861 | A | 12/1984 | Saito et al. | |
| 5,613,517 | A | 3/1997 | Handler | |
| 5,730,335 | A | 3/1998 | Maas et al. | |
| 6,095,381 | A * | 8/2000 | Schwanenberg | 222/490 |
| 6,378,739 | B1 | 4/2002 | Maas et al. | |
| 6,431,229 | B1 | 8/2002 | Birtcher et al. | |
| 6,789,303 | B2 | 9/2004 | Maas et al. | |
| 7,503,469 | B2 * | 3/2009 | Bloom et al. | 222/494 |
| 7,556,060 | B2 * | 7/2009 | Guala | 137/599.03 |
| 8,256,648 | B2 * | 9/2012 | Maas et al. | 222/383.1 |
| 8,397,957 | B2 * | 3/2013 | Bloom et al. | 222/494 |
| 2003/0089409 | A1 * | 5/2003 | Morimoto | B60S 1/52 137/859 |

FOREIGN PATENT DOCUMENTS

| | | | |
|---|---|---|---|
| WO | 96/12904 | A2 | 5/1996 |
| WO | 98/29786 | A2 | 7/1998 |

* cited by examiner

PRECOMPRESSION SYSTEM FOR A LIQUID DISPENSING DEVICE AND METHOD OF ASSEMBLING SUCH PRECOMPRESSED SYSTEM

This application is a continuation of U.S. Ser. No. 11/743,554, filed May 2, 2007, which claims priority to European Patent Application No. 07006107.2 filed Mar. 24, 2007, the contents of each of which are hereby incorporated by reference in their entirety.

FIELD OF THE INVENTION

The present invention relates to liquid dispensers and more specifically relates to a precompression system for a liquid dispenser whereby liquid in a container is not discharged from the dispenser until a predetermined pressure level is reached. The invention also relates to a method of assembling such a precompression system in a liquid dispenser.

BACKGROUND OF THE INVENTION

Containers having liquid dispenser assemblies secured thereto are well known. U.S. Pat. No. 5,730,335 discloses a liquid dispenser including a precompression system. This liquid dispenser is a trigger sprayer having a sprayer housing that may be fixed onto the neck of a container. The sprayer housing contains a manually operated pump. An operating element in the shape of a trigger as pivotally connected to the housing for operating the pumb. A dip tube may extend from the pump and into the container so that the liquid in the container may be drawn through the dip tube and into the pump during operation thereof. The trigger sprayer also includes an outlet in fluid communication with the pump for discharging the fluid. The trigger sprayer further includes a spring located in the pump for biasing the piston of the pump to return to a charged position at the end of a discharging pump stroke.

The precompression system of this prior art trigger sprayer serves to prevent liquid from leaving the outlet at too low a pressure, which would result in insufficient atomization of the liquid with large drops of fluid or liquid being formed in the spray pattern. The precompression system includes a precompression valve moveable between a position that closes off communication between the pump and the outlet and an open position in which it is spaced from a valve seat for opening communication between the pump and the outlet. The precompression valve is a shallow dome made of a spring material, such as stainless spring steel or a stiff but resilient plastic material. It is biased toward a closed position, in which its convex side engages the valve seat, by its inherent spring characteristics. The precompression valve is flexed to its open position only when a predetermined pressure is attained within the pump.

Among the problems associated with this prior art liquid dispenser and its precompression system are the large number of separate parts, which moreover are made from different materials, and the sometimes irregular dispensing pressures achieved by the precompression system.

The high number of parts results in a product that is both difficult to manufacture and assemble. As a result, both the manufacturing and the assembly of the dispenser parts are expensive and time consuming. In addition, the different materials pose problems in handling and recycling the trigger sprayer and the container when the items are ready to be discarded. For example, the metal spring used for returning the piston and the stainless steel spring valve must both be removed from the trigger sprayer before the plastic portion of the item may be recycled.

The variations in the pressure that is built up in the prior art precompression system is due to the fact that the convex side of the dome shaped spring valve is moved away from the valve seat by flexing the valve such that it assumes a somewhat “wavy” shape in cross section. This is an unstable situation, which may lead to the same amount of pump pressure resulting in varying deformation and consequently varying degrees of opening of the coring valve. Moreover, there is a risk that the spring valve may abruptly snap to an inverted position, thus leaving an open connection between the pump and the outlet.

In response to the above problems, commonly assigned U.S. Pat. No. 6,378,739 discloses another liquid dispenser which includes a precompression system. In this prior art liquid dispenser, which has generally the same functionality and structure as the dispenser of the ’335 patent discussed above, both the number of separate parts and the use of different materials is reduced in comparison to the liquid dispenser of the ’335 patent. To this end the springs for returning the piston at the end of a pump stroke are made from a plastics material and are integrally molded with the neck of the container. Moreover, the precompression system of this brier art liquid dispenser includes a precompression valve that is made of a plastics material as well and that is integrally molded with a sleeve which mounts the valve in a valve chamber. This extensive, use of integrally molded plastic structures limits the number of separate parts, resulting in a liquid dispenser that is easy to manufacture and assemble. Moreover, handling and recycling of the liquid dispenser when it is discarded after use is facilitated.

The precompression valve of the liquid dispenser disclosed in the ’739 patent includes a dome shaped elastic diaphragm that engages the precompression valve seat with its convex side. Therefore, this elastic diaphragm is still prone to inversion when subjected to pump pressure. In order to limit the amount of deflection of the diaphragm and prevent it from being moved to an inverted position, a stop member protrudes from the concave side of the diaphragm towards a fixed part of the dispenser housing. Nevertheless, the degree to which the diaphragm deflects when the pressure in the pump increases and consequently also the valve opening may vary.

SUMMARY OF THE INVENTION

The present invention relates to various types of precompression systems for liquid dispensers and assembly methods for making such precompression systems that overcome the problems described above.

In accordance with a first aspect of the present invention, a precompression system for a liquid dispensing device that has an inlet and an outlet comprises a pump chamber and a valve chamber. The pump chamber includes a piston that is movable in the pump chamber for drawing liquid through the inlet and discharging the liquid through the outlet. The valve chamber includes a valve member that is disposed between the pump chamber and the outlet and that is operable to allow liquid in the pump chamber to reach the outlet only after a predetermined pressure is established in said pump chamber and to stop liquid from reaching the outlet when the pressure in the pump chamber falls below said predetermined pressure. The valve chamber has an inlet end in fluid communication with said pump chamber, an outlet end in fluid communication with the outlet and a valve seat that is arranged between the inlet end and the outlet end and that has an opening extending there through. The valve member comprises an elastic diaphragm that normally closes the valve seat opening and that includes a concave surface facing the valve seat opening and in fluid communication with the pump chamber and a convex surface in fluid communication with atmospheric pressure. By arranging the elastic diaphragm such that its concave surface faces and engages the valve seat, the pressure at which the precompression valve opens may be controlled more accurately. This is due to the fact that the valve is opened by stretching of the elastic diaphragm, rather than flexing. Moreover, this configuration of the valve member avoids any risk of inversion of the diaphragm.

In a preferred embodiment, she elastic diaphragm is stretched around the valve seat. By stretching the diaphragm it is prestressed, which results in improved sealing and better control of the opening pressure.

In a further preferred embodiment the elastic diaphragm has an outer periphery and the valve member includes a sleeve surrounding and holding the outer periphery of the diaphragm and extending substantially perpendicular to the plane of the diaphragm, the sleeve being sealingly arranged in the valve chamber. In this way the elastic diaphragm may be easily mounted in the valve chamber.

In order to reduce the number of separate parts and to facilitate manufacture and assembly of the precompression system, it is preferred that the elastic diaphragm and the sleeve be integrally molded from a plastics material. Since the diaphragm is arranged with its concave side against the valve seat and the valve is operated by stretching, rather than by deflection of the diaphragm, the plastics material may be more flexible than in the case of a convex valve as described in the prior art. Suitable plastic materials are e.g. polypropylene or polyethylene.

The elastic diaphragm may advantageously be molded in an unstretched shape that is substantially less concave than its shape when stretched over the valve seat. In this manner a suitable degree of prestress may be obtained. Preferably, the elastic diaphragm is molded in a convex shape and is stretched to a concave shape when the sleeve is arranged in the valve chamber.

In order to ensure that deformation of the valve member will be limited to the elastic diaphragm only, the sleeve preferably includes a plurality of ribs extending along an inner wall thereof substantially perpendicular to the plane of the diaphragm. In this way movement of the diaphragm is well defined, while the sleeve will continue to seal the valve chamber.

In a further preferred embodiment of the precompression system of the invention, the sleeve has a lengthwise dimension substantially perpendicular to the plane of the diaphragm and a diametral dimension substantially parallel to the plane of the diaphragm, wherein the lengthwise dimension is greater than a corresponding dimension of the valve chamber. This ensures that the sleeve is clamped tightly in the valve chamber when the precompression system is assembled.

Where the sleeve has a lengthwise dimension substantially perpendicular to the plane of the diaphragm and a diametral dimension substantially parallel to the plane of the diaphragm, this diametral dimension may further advantageously be greater than the lengthwise dimension. This results in a relatively short and sturdy sleeve, which is less prone to deformation when the valve member is subjected to the pressure generated by the pump.

A precompression system which is relatively easy to assemble is obtained when the dispensing device comprises a shroud including an end wall, and the end wall of the shroud is in alignment with the valve chamber and in contact with she sleeve for securing the valve member within the valve chamber.

The invention further provides a liquid dispensing device having an inlet and an outlet and a precompression system arranged between the inlet and outlet, wherein the precompression system comprises a pump chamber including a movable piston, and a valve chamber including a valve member disposed between the pump chamber and the outlet. The valve chamber has an inlet end, an outlet end and a valve seat arranged between the inlet end and the outlet end, with an opening extending through the valve seat. The valve member comprises an elastic diaphragm normally closing the valve seat opening and including a concave and a convex surface. The concave surface of the elastic diaphragm faces the valve seat opening and is in fluid communication with the pump chamber, while its convex surface is in fluid communication with atmospheric pressure.

In accordance with yet another aspect of the invention a method is provided for assembling a precompression system for a liquid dispensing device having an inlet and an outlet. This inventive method comprises providing a pump chamber including a piston movable therein and providing a valve chamber disposed between the pump chamber and the outlet. This valve chamber has an inlet end in fluid communication with said pump chamber, an outlet end in fluid communication with the outlet and a valve seat arranged between the inlet end and the outlet end and having an opening extending therethrough. The method further includes arranging a valve member in the valve chamber such that it normally closes the valve seat opening. In this method the valve member comprises an elastic diaphragm including a concave surface facing the valve seat opening and in fluid communication with the pump chamber and a convex surface in fluid communication with atmospheric pressure.

In another embodiment the invention provides a precompression system for a liquid dispensing device having an inlet and an outlet. This precompression system comprises a pump chamber including a piston movable in the pump chamber for drawing liquid through the inlet, and discharging the liquid through the outlet; and a valve chamber including a valve member disposed between the pump chamber and the outlet and being operable to allow liquid in the pump chamber to reach the outlet only after a predetermined pressure is established in said pump chamber and to stop liquid from reaching the outlet when the pressure in the pump chamber falls below said predetermined pressure. The valve chamber has an inlet end in fluid communication with the pump chamber, an outlet end in fluid communication with the outlet and a valve seat arranged between the inlet end and the outlet end and having an opening that extends through the valve seat. The valve member comprises an elastic diaphragm that is stretched around the valve seat and that normally closes the valve seat opening.

In accordance with yet another aspect of the invention a method of assembling such a precompression system is provided. The inventive method comprising the steps of providing a pump chamber, providing a valve chamber and arranging a valve member in the valve chamber. The pump chamber that is provided includes a movable piston, while the valve chamber is disposed between the pump chamber and the outlet. The valve chamber that the method provides has an inlet end in fluid communication with the pump chamber, an outlet end in fluid communication with the outlet and a valve seat arranged between the inlet end and the outlet end and having an opening extending therethrough. The valve member that is arranged in the valve chamber comprises an elastic diaphragm and is arranged such that the elastic diaphragm is stretched around the valve seat and normally closes the valve seat opening.

Finally, the invention provides a valve member for use in a valve chamber of a precompression system for a liquid dispensing device. The valve member of the invention comprises an elastic diaphragm engaging a valve seat in the valve chamber. This elastic diaphragm includes a concave surface engaging the valve seat and a convex surface facing away from the valve seat.

DETAILED DESCRIPTION OF PREFERRED EMBODIMENTS

Figure 1:
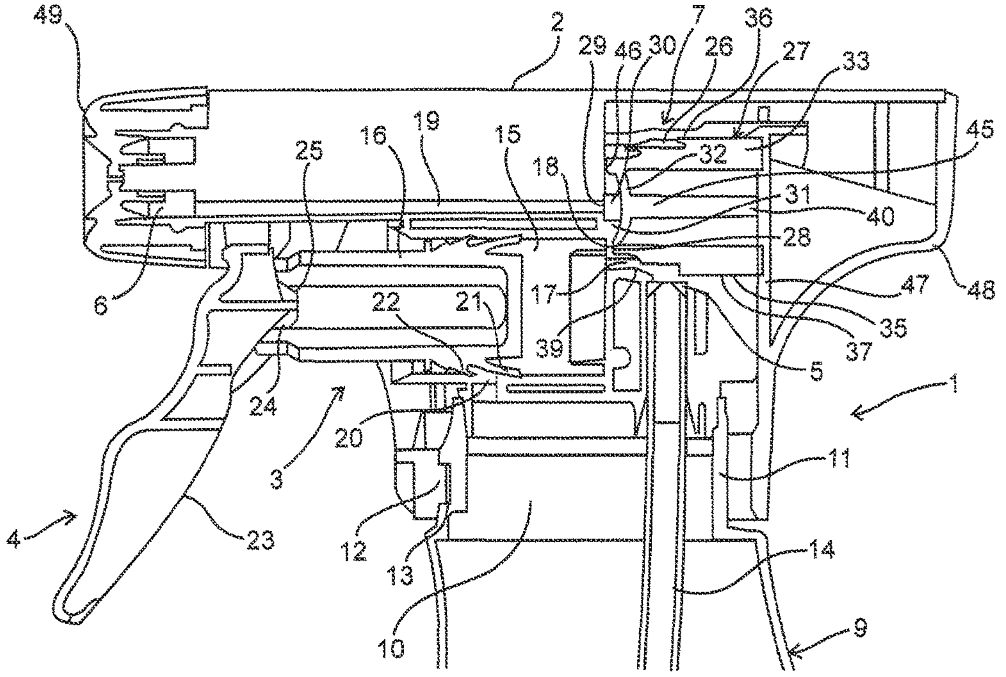
FIG. 1 shows a longitudinal sectional view of a liquid dispenser subassembly having a housing, a piston, a trigger, an outlet nozzle and a precompression system in accordance with a first embodiment of the present invention.

FIG. 1 shows a fragmentary longitudinal sectional view of a liquid dispenser 1 in accordance with a first embodiment of the present invention. The liquid dispenser 1 comprises a housing 2, a pump 3, an operating mechanism 4, an inlet 5, an outlet 6 and a precompression system 7. A discharge nozzle 49 is arranged on the outlet 6 for atomizing the liquid that is dispensed. The liquid dispenser 1 is connected to a container 9 having an opening 10 bordered by a neck 11. In the illustrated embodiment this connection is a snap connection, which is effected by snapping lugs 12 arranged on an inner surface of the housing 2 into recesses 13 formed in the outer surface of the neck 11. A dip tube 14 extends from the inlet 5 of the liquid dispenser 1 into the container 9 for drawing liquid from the container 9 into the liquid dispenser 1.

The pump 3 includes a pump chamber 15 and a piston 16 that is arranged in the pump chamber 15 for reciprocating movement. Pump chamber 15 has an inlet opening 17 communicating with the liquid dispenser inlet 5 and an outlet opening 18 communicating with a discharge conduit 19 that leads to the liquid dispenser outlet 6. Pump chamber 15 further has an aerating opening 20 communicating with the interior of the container 9. This aerating opening 20 is selectively opened and closed by two peripheral flaps 21, 22 arranged on the piston 16.

The operating mechanism 4 includes a trigger 23, the top of which is pivotally connected to the housing 2 by means of a hinge (not shown here). Trigger 23 is also pivotally connected to piston 16 by means of a pin 24 received in an opening 25. The trigger 23 is biased to its extended position as shown in FIG. 1 by a pair of flexion springs (not shown here), which are arranged in the housing 2 outside the pump chamber 15.

The precompression system 7 is arranged between the pump chamber 15 and the outlet 6. It includes a valve chamber 26 in which a precompression valve member 27 is arranged. The valve chamber 26 has an inlet end 28 communicating with the pump chamber outlet opening 18 and an outlet end 29 communicating with the discharge conduit 19 and hence the liquid dispenser outlet 6. Arranged between the inlet and outlet ends 28, 29 is an annular valve seat 31, which surrounds a valve opening 30 that constitutes the outlet end 29 of the valve chamber. Precompression valve member 27 includes an elastic diaphragm 32 which normally closes the valve opening 30. This elastic diaphragm 32 is dome shaped and includes a concave surface 32A facing the valve seat 31 and its opening 30, as well as a convex surface 32B facing away from the valve seat opening 30 towards the interior of valve chamber 26. A stabilizing member 45 is attached to the center of the convex surface 32B.

Figure 2:
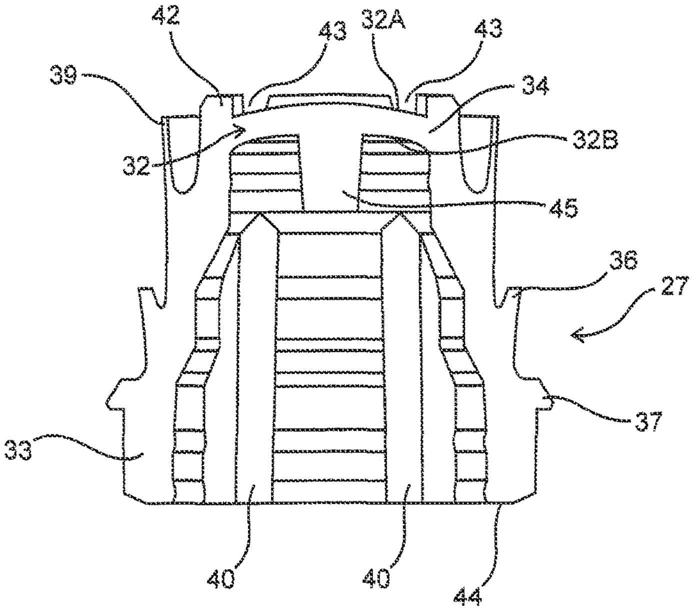
FIG. 2 shows a longitudinal sectional view of the precompression valve used in the liquid dispenser of FIG. 1.
Figure 3:
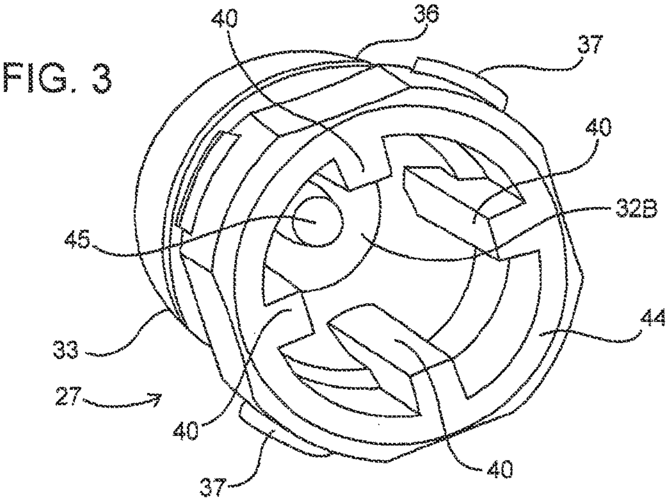
FIG. 3 shows a bottom perspective view of the precompression valve of FIG. 2.

Precompression valve member 27 further includes a sleeve 33 surrounding and holding an outer periphery 34 of the elastic diaphragm 32. This sleeve 33 is arranged in the valve chamber 26 and seals against an inner wall 35 thereof by means of a peripheral flap 36 and an annular ridge 37 arranged on an outer surface 38 of the sleeve 33. Sleeve 33 further includes a second peripheral flap 39 which serves as a flap valve between liquid dispenser inlet 5 and inlet opening 17 of pump chamber 15. Finally, as shown more clearly in FIGS. 2 and 3, sleeve 33 includes a plurality of ribs 40 evenly distributed in peripheral direction and extending along an inner surface 41 of the sleeve 33. In the illustrated embodiment there are four ribs 40 each spaced 90 degrees from the adjacent ribs 40.

Sleeve 33 has a stepped contour which corresponds with the stepped configuration of the inner wall 35 of the valve chamber 26. Sleeve 33 extends beyond the plane of the elastic diaphragm and has an inner ridge 42—when considered in the direction of valve chamber 26—which engages a bottom surface 46 of the valve chamber 26. The inner ridge 42 includes a plurality of openings 43 allowing liquid to flow from the pump chamber 15 towards the discharge conduit 19. The length of the sleeve 33 measured from the inner ridge 42 to an outer ridge 44 is slightly greater than the corresponding depth of the valve chamber 26. This ensures that the valve member 27 is tightly clamped in the valve chamber 26 when the liquid dispenser 1 is assembled. The force required for pressing the valve member 27 tightly into the valve chamber 26 is provided by an end wall 47 that forms part of a shroud 48 of the dispenser housing 2

Valve member 27 including the sleeve 33 and elastic diaphragm 32 is integrally molded front a plastics material, like e.g. polypropylene. When molded, the elastic diaphragm 32 has a shape which is substantially less concave—considered in the direction facing the valve seat 31—than it has when the valve member 27 is arranged in the valve chamber 26. In the illustrated embodiment the elastic diaphragm 32 is actually molded in a convex shape, which is inverted when the valve member 27 is pressed into the valve chamber 26 by the end wall 47. In this way the elastic diaphragm 32 is prestressed against or stretched over the valve seat 31, which is an important feature with a view to obtaining excellent sealing until the liquid in the pump chamber 15 reaches the predetermined pressure at which the precompression valve should open.

Figure 4:
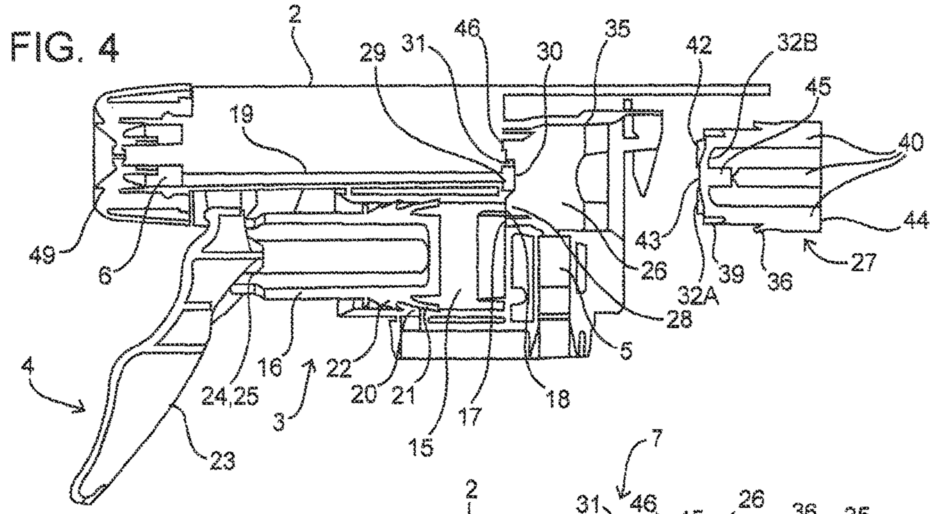
FIG. 4 shows a first step for assembling the precompression system of the liquid dispenser in accordance with the first embodiment of the present invention.
Figure 5:
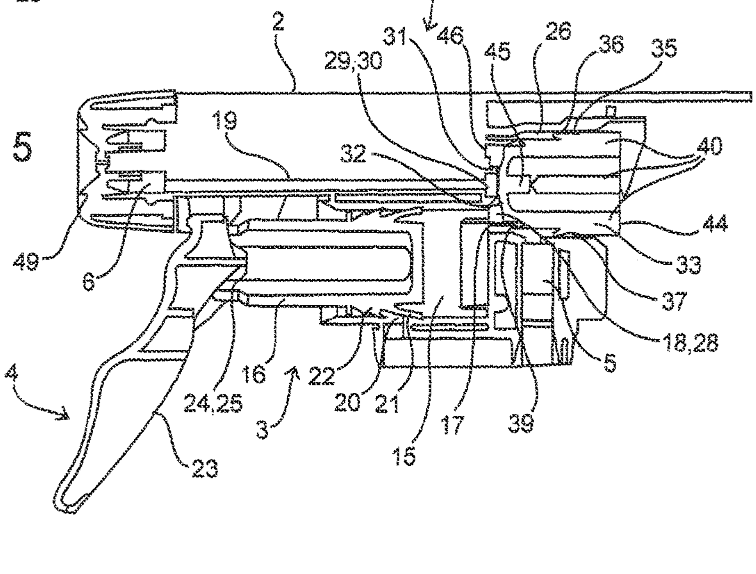
FIG. 5 shows the dispenser subassembly with the precompression valve loosely arranged in a valve chamber.

Referring to FIG. 4, the precompression system 7 is assembled by first inserting the valve member 27 in the valve chamber 26, which is integrally formed as part of the housing 2 of the liquid dispenser 1. The valve member 27 is first pressed into the valve chamber 26 until the elastic diaphragm 32 engages the valve seat 31. In this position, which is shown in FIG. 5, the inner ridge 42 does not yet engage the bottom 46 of valve chamber 26. Since the distance between the elastic diaphragm 32—when unstressed—and the outer ridge sleeve 33 is greater than the distance between the valve seat 31 and the end of valve chamber 26, sleeve 33 of valve member 27 still protrudes somewhat from valve chamber 26.

Figure 6:
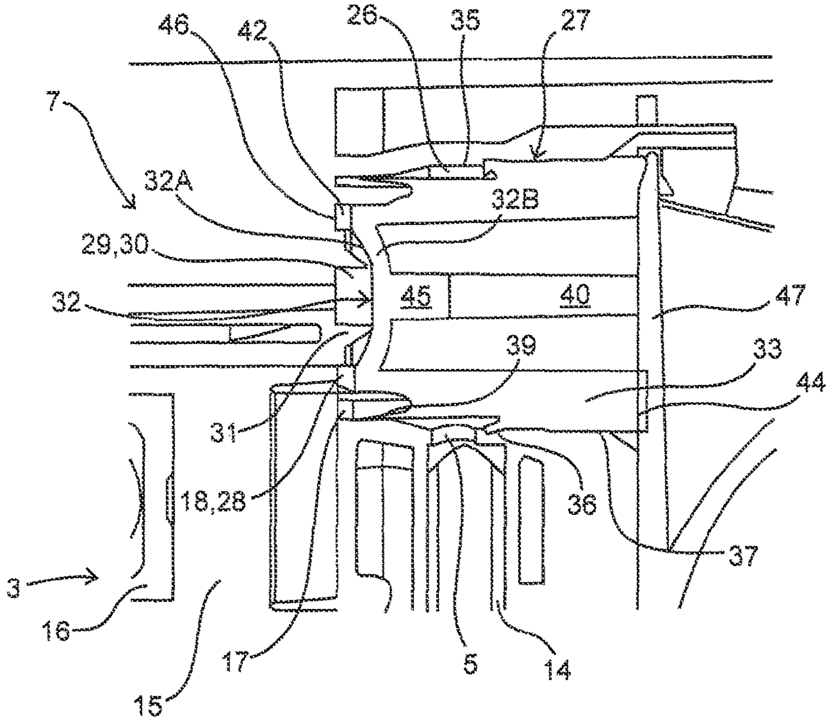
FIG. 6 shows a fragmentary longitudinal sectional view of the liquid dispenser after a shroud of the housing has been mounted so as to secure and prestress the precompression valve.

In a final assembly step the shroud 48 is connected to the rest of the housing 2. During this step the end wall 47 engages the protruding outer ridge 44 of sleeve 33 and presses valve member 27 tightly into valve chamber 26 until the inner ridge 42 abuts the valve chamber bottom 46. Since the valve seat 31 protrudes further from the valve chamber bottom 46 than the distance between the sleeve inner ridge 42 and the elastic diaphragm 32, the latter is stretched over the valve seat 31 and the face 32A of the diaphragm 32 assumes its concave shape, as shown in FIG. 6. The liquid dispenser 1 is now ready for operation.

When the trigger 23 is first operated, the piston 16 will move inwards, reducing the volume of the pump chamber 15 and thereby compressing the air inside—assuming the pump 3 has not been primed. The resulting air pressure is not enough to force the precompression valve away from the valve seat 31. When the trigger 23 is released, it will be returned to its original position by the springs. During this return or suction stroke, the pressure in she pump chamber 16 will be lowered, thus drawing liquid from the container 9 through the dip tube 14 and the dispenser inlet 5, past the flap valve 39, through the inlet opening 17 into the pump chamber 16.

Figure 7:
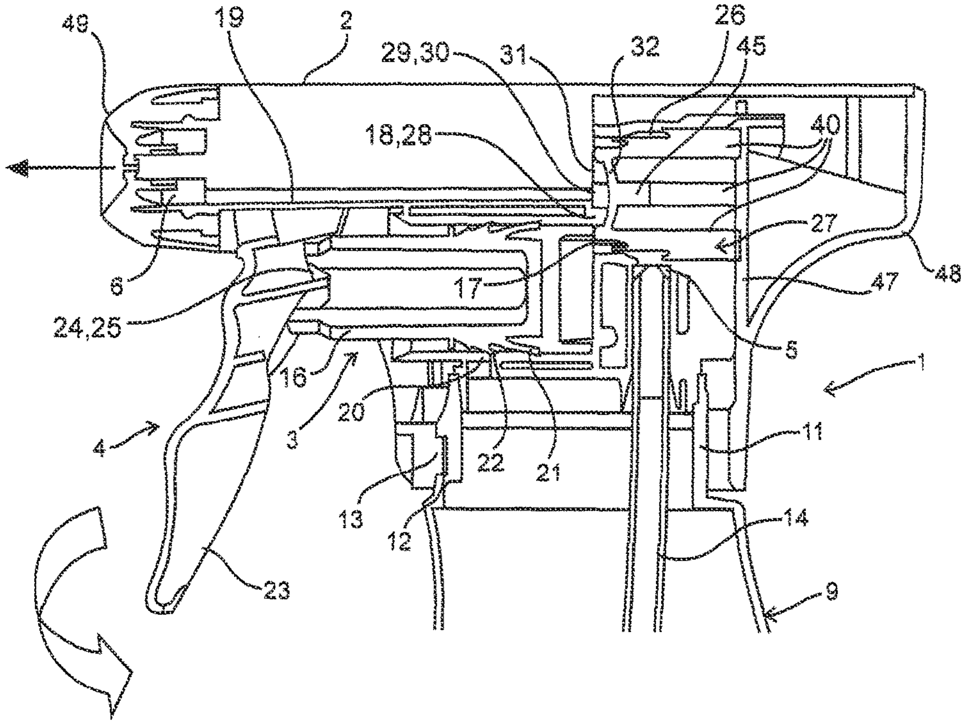
FIG. 7 shows a longitudinal sectional view of the liquid dispenser of FIG. 1 during a pump stroke, when the precompression valve is opened.

When the trigger 23 is operated again, movement of the piston 16 will result in a sharp increase in the pressure within the pump chamber 16, since the liquid is not compressible. This pressure acts on all parts of the pump chamber 16 and is also present in the outlet opening 18, which is closed by the elastic diaphragm 32 of the precompression valve 27. Once the pressure exceeds a predetermined value, for instance in the order of three bar, the elastic diaphragm 32 will stretch and be lifted from the valve seat 31, as shown in FIG. 7. This pressure is determined by the elasticity of the diaphragm 32 and the ambient pressure, which acts on the convex surface 320 of the diaphragm 32. Once the diaphragm 32 is lifted from the valve seat 32 pressurized liquid from the pump chamber 16 may flow through the outlet opening 18, between the valve seat 31 and the elastic diaphragm 32, into the valve opening 30. From there the liquid will flow through the discharge conduit 19 to the outlet 6 of the liquid dispenser 1. Since the liquid is dispensed only after reaching the predetermined pressure, it will be properly atomized upon leaving the outlet 6 and the spraying pattern will be evenly distributed, without any large drops being dispensed.

Figure 8:
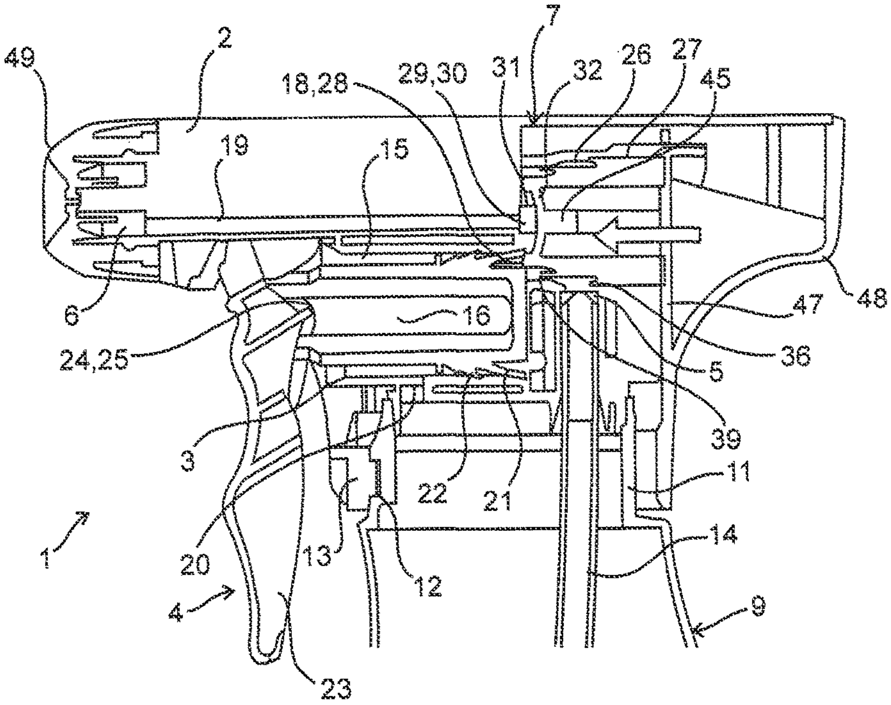
FIG. 8 is a view corresponding with FIG. 7 and showing the liquid dispenser at the end of the pump stroke, when the precompression valve is closed again.

Referring now to FIG. 8, when the pressure in the pump chamber 16 drops below the predetermined level at the end of the pump stroke, the elasticity of the diaphragm 32 will overcome the liquid pressure. Consequently the diaphragm 32 will contract again until it comes to rest against the valve seat 31. This closes the valve opening 30 and instantly interrupts the flow of liquid from the pump 3 to the outlet 6. In this way the liquid dispenser 1 will not "drip" at the end of the pump stroke.

Figure 9:
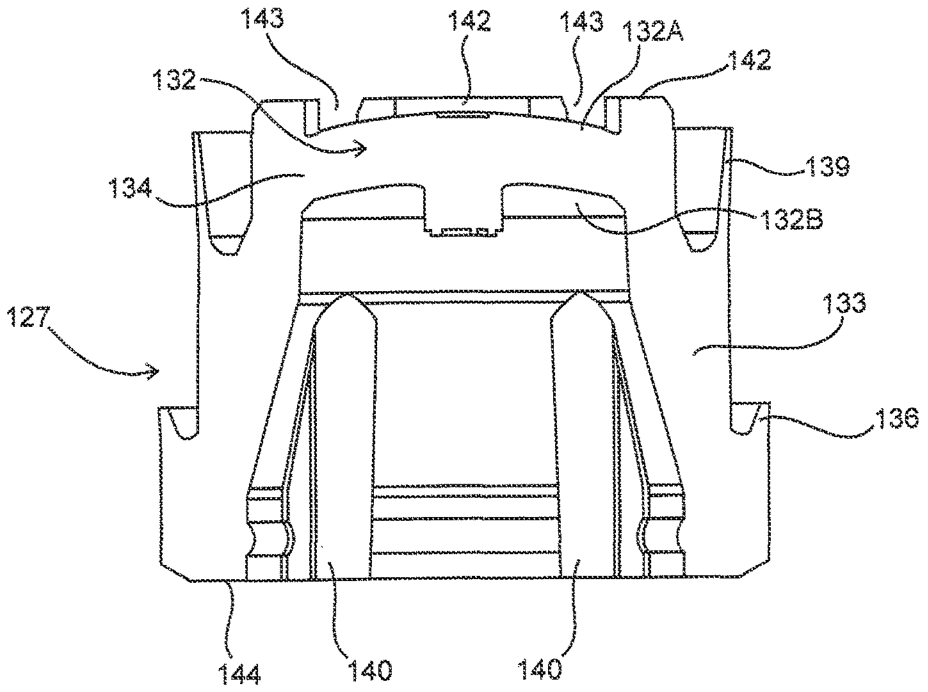
FIG. 9 is a view corresponding with FIG. 2 and showing a precompression valve used in a second embodiment of the present invention.
Figure 10:
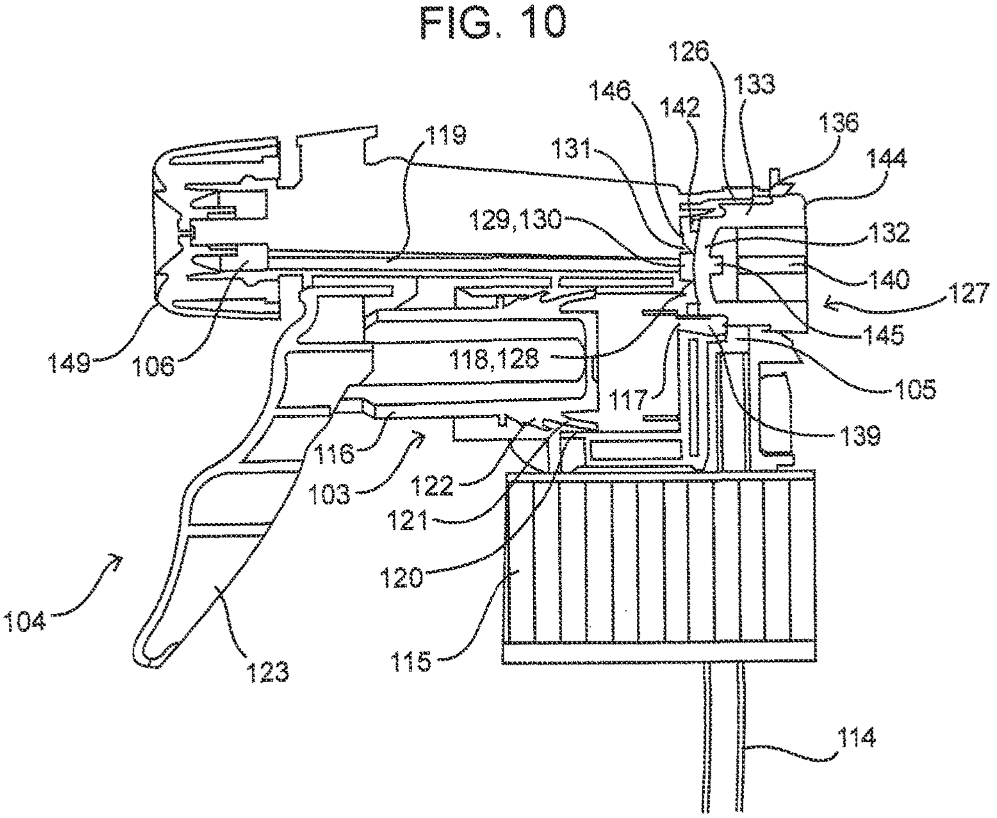
FIG. 10 is a view corresponding with FIG. 5 and showing the second embodiment of the precompression valve loosely arranged in a valve chamber.
Figure 11:
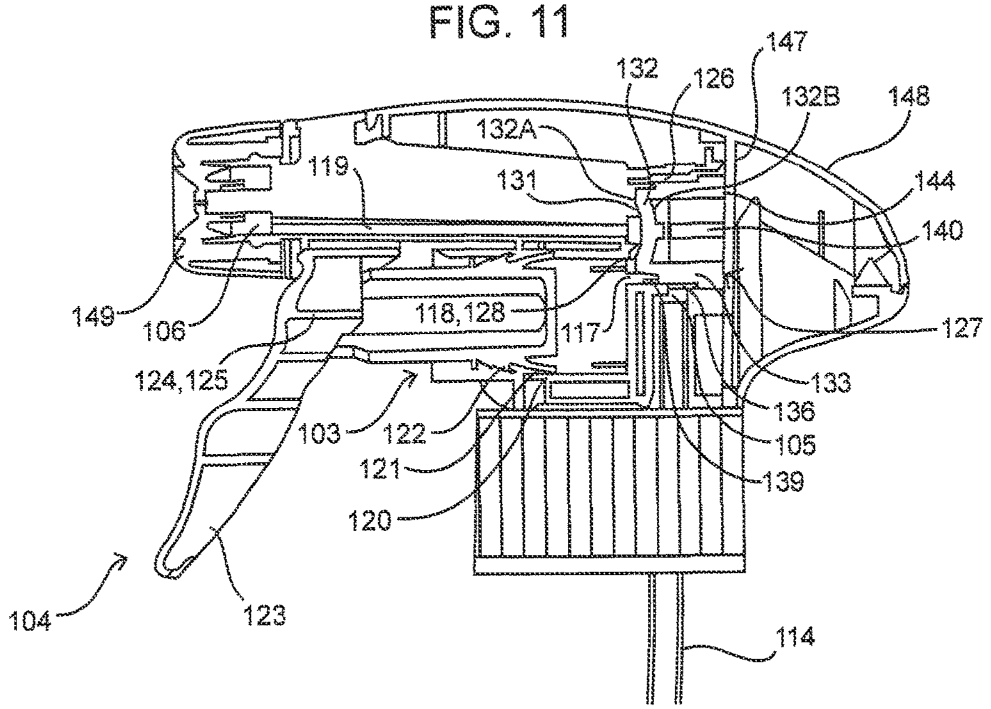
FIG. 11 is a view corresponding with FIG. 1 and showing the second embodiment of the liquid dispenser after assembly.

FIG. 9 shows a valve member 127 for use in a second embodiment of the precompression system 107. This valve member 127 has a square, rather than elongated shape, since its length—the distance between the inner and outer edges 142 and 144, respectively—is no larger than its diameter. This configuration results in a sturdy sleeve 133, which has even less tendency to deform when pressure is applied to the diaphragm 132. Although the length of this alternative valve member 127 is smaller than that of the valve member 27 of the first embodiment, it is still longer than the depth of the valve chamber 126. Consequently, the outer ridge 144 still protrudes from the valve chamber 126 when the valve member 127 has been inserted up to the point where the diaphragm 132 contacts the valve seat 131, as shown in FIG. 10. Therefore, also in this embodiment the elastic diaphragm 132 is stretched and prestressed when the valve member 127 is finally clamped tight in the valve chamber 126 by connecting the shroud 148 including she end wall 147 to the rest of the liquid dispenser 101, as illustrated in FIG. 11.

Figure 12:
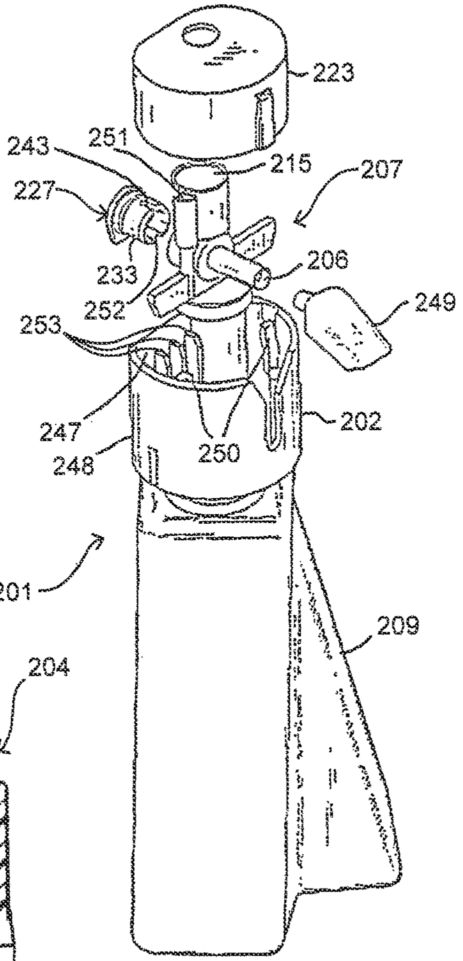
FIG. 12 is an exploded view of a liquid dispenser including a housing, a pushbutton type operating element, a precompression valve, a dip tube, a locking element and a container, in accordance with a third embodiment of the present invention.

FIG. 12 shows a liquid dispenser 201 in accordance with a third embodiment of the present invention. Like the first and second embodiments, this liquid dispenser 201 comprises a housing 202, a pump 203, an operating mechanism 204, an inlet 205, an outlet 206 and a precompression system 207. The liquid dispenser 201 is again connected to a container 209 having an opening 210 bordered by a neck 211. A dip tube 214 again extends from the inlet 205 of the liquid dispenser 201 into the container 209 for drawing liquid from the container 209 into the liquid dispenser 201.

This liquid dispenser 201 is not a trigger sprayer, but is intended for dispensing more viscous liquids like e.g. hand soap. Consequently, the discharge nozzle 249 at the outlet 206 is not arranged for atomizing the liquid, but merely for deflecting the flow of liquid downward. The dispenser further has a different mechanism for operating the pump 203, using a pushbutton 223 that is slidable within the housing 202, rather than a hinged trigger. The pushbutton 223 is biased to a position of rest by two substantially S-shaped combined torsion/flexion springs 250, only one of which is shown. In this embodiment of the liquid dispenser 201 the piston 216 is integrated in the pushbutton 223. This embodiment of the liquid dispenser 201 further includes a vent chamber 251 arranged next to the pump chamber 215.

The pushbutton 223 also includes a second piston (not shown here) that is arranged for reciprocating movement in the vent chamber 251.

Figure 13:
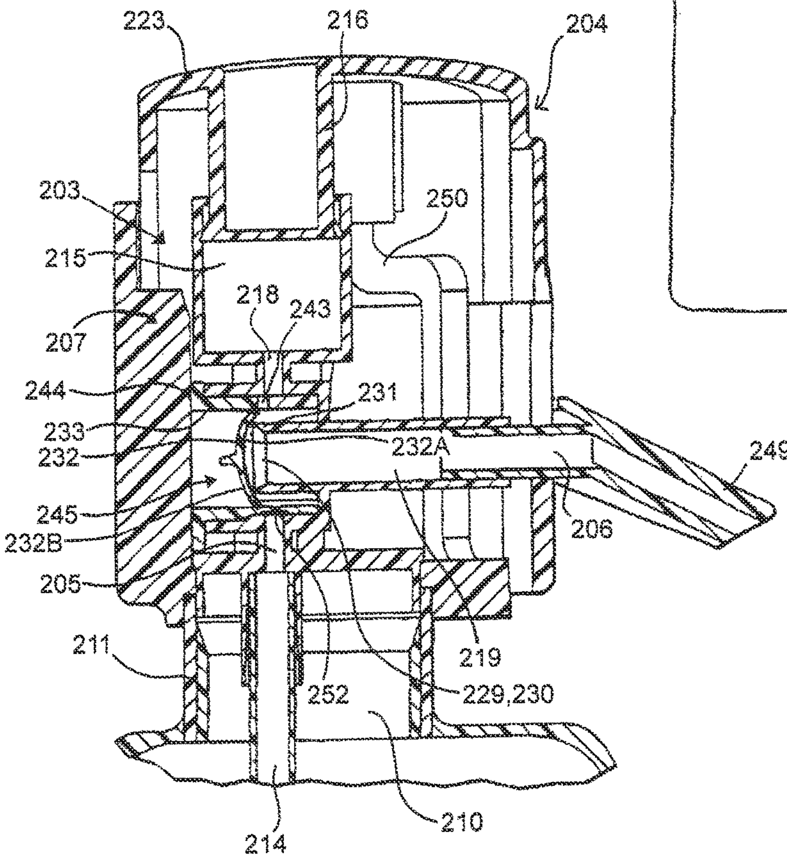
FIG. 13 shows a fragmentary cross-sectional view of the liquid dispenser of FIG. 23 after final assembly thereof.

The valve member 227 of this third embodiment is somewhat different from that of the first two embodiments in that the elastic diaphragm 232 is arranged substantially halfway the sleeve 233, rather than near its inner ridge 242. Like in the first two embodiments, the diaphragm 232 is stretched over the valve seat 231, as shown in FIG. 13. Its concave side 232A again faces both the valve opening 230 and the outlet opening 218 of the pump chamber 215 and is exposed to the pressure generated by the pump 203. The convex side 232B of the elastic diaphragm 232 faces the rear of the valve chamber 226 and is exposed to atmospheric pressure.

Again, the elastic diaphragm 232 is originally molded in a shape that is substantially less concave than the shape it has to assume by being stretched over the valve seat 231 when valve member 227 is inserted into valve chamber 226. This deformation of the elastic diaphragm 232 leads to a certain degree of prestress that results in an excellent seal between the diaphragm 232 and the valve seat 231. Depending on the degree of prestress that is required to obtain the required sealing action and a specific precompression of the liquid, the elastic diaphragm 232 may also be molded in a straight or even a convex shape.

The sleeve 233 includes an opening 243 in its side wall 235 for allowing liquid to pass from the outlet opening 218 of the pump chamber 215 to the valve opening 230. Since in this embodiment the pump 203 and the inlet 205 are arranged on opposite sides of the valve chamber 226, the sleeve 233 further includes a groove 252 allowing liquid to pass along the outside of the sleeve 233. In this embodiment, the outer ridge 244 of the sleeve 233 has a somewhat greater diameter than the outer end of the valve chamber 226 so that it is held thereby. The valve member 227 is locked in position by a plurality of ribs 253 protruding from end wall 247 of shroud 248.

Reciprocating movement, of the pushbutton 223 between its two positions also reciprocates the pump piston 216 and the vent piston in the pump chamber 215 and vent chamber 251, respectively. During a suction stroke, the pump piston 216 moves in an onward direction to create a vacuum in the pump chamber 215, thereby drawing liquid from the container 209 through dip tube 214 and inlet 205, past the sleeve 233 and into the pump chamber 215. During a discharge stroke, the pump piston 216 moves in a downward direction to reduce the volume of the pump chamber 215. Once the pressure within the pump chamber 215 is greater than the combined elastic force of the diaphragm 232 and the ambient pressure on the convex face 232B of the diaphragm, the diaphragm 232 stretches and moves away from the valve seat 231 and the liquid is free to pass through the valve opening 230 and into the discharge conduit 219 towards the outlet 206.

Although the invention has been illustrated by means of a number of examples, it should be apparent that it is not limited thereto. For example, the precompression system might be used in other types of liquid dispensers. Moreover, the flexible diaphragm and sleeve of the valve member could be formed separately. In addition, both the configuration of the elastic diaphragm and sleeve and the choice of materials might be varied as well. Accordingly, the scope of the invention is defined solely by the appended claims.

What is claimed is:

1. A valve system for a liquid dispensing device having an inlet and an outlet, comprising:

a pump chamber including a piston movable in the pump chamber for drawing liquid through the inlet and discharging the liquid through the outlet;

and a valve chamber including a valve member disposed between the pump chamber and the outlet, wherein the valve chamber has an inlet end in fluid communication with said pump chamber, an outlet end in fluid communication with the outlet and a valve seat arranged between the inlet end and the outlet end and having an opening extending therethrough, wherein the valve member comprises an elastic diaphragm stretched around the valve seat normally closing the valve seat opening in a closed state, a first side of said diaphragm facing the valve seat opening and being in fluid communication with the pump chamber and a second side of said diaphragm in communication with atmospheric pressure, and wherein said valve member is compressively tensioned in said closed state and is arranged to move away from said valve seat to an open state where it is further compressively tensioned when subjected to at least a predetermined pressure of the liquid, wherein the valve member includes a sleeve integral with and surrounding and holding the outer periphery of the diaphragm, said sleeve being provided within said valve chamber, said sleeve having a lengthwise dimension that is substantially parallel to a direction of motion of the diaphragm within the valve chamber, and greater than a corresponding depth of the valve chamber, such that the sleeve is tightly pressed into the valve chamber in a compressed manner, and wherein the sleeve has one or more diametral dimensions substantially parallel to a plane of the diaphragm, at least one of said diametral dimensions being greater than said lengthwise dimension.

2. The valve system of claim 1, wherein the length of the sleeve extends substantially perpendicular to the plane of the diaphragm.

3. The valve system of claim 1, wherein the elastic diaphragm and the sleeve are integrally molded from a plastics material.

4. The valve system of claim 1, wherein the elastic diaphragm is molded in an unstretched shape that is substantially less concave than its shape when stretched over the valve seat.

5. The valve system of claim 4, wherein the elastic diaphragm is molded in a convex shape and is stretched to a concave shape when the sleeve is arranged in the valve chamber.

6. The valve system of claim 4, wherein the sleeve includes a plurality of ribs extending along an inner wall thereof substantially perpendicular to the plane of the diaphragm.

7. The valve system of claim 1, wherein the lengthwise dimension of the sleeve is substantially perpendicular to the plane of the diaphragm.

8. The valve system of claim 1, wherein said valve chamber is operable to allow liquid in the pump chamber to reach the outlet only after a predetermined pressure is established in said pump chamber.

9. The valve system of claim 8 wherein said valve chamber is further operable to stop liquid from reaching the outlet when the pressure in the pump chamber falls below said predetermined pressure.

10. The valve system of claim 1, wherein the sleeve includes at least one stabilizing member holding the sleeve substantially fixed as the diaphragm moves.

11. A liquid dispensing device having an inlet and an outlet, and a valve system arranged therebetween the valve system comprising:

a pump chamber including a piston movable in the pump chamber for drawing liquid through the inlet and discharging the liquid through the outlet; and a valve chamber including a valve member disposed between the pump chamber and the outlet, wherein the valve chamber has an inlet end in fluid communication with said pump chamber, an outlet end in fluid communication with the outlet and a valve seat arranged between the inlet end and the outlet end, wherein the valve member comprises an elastic diaphragm stretched around the valve seat normally closing the valve seat opening in a closed state, a first side of said diaphragm facing the valve seat opening and being in fluid communication with the pump chamber and a second side of said diaphragm in communication with atmospheric pressure, and wherein said valve member is compressively tensioned in said closed state and is arranged to move away from said valve seat to an open state where it is further compressively tensioned when subjected to at least a predetermined pressure of the liquid, wherein the valve member includes a sleeve integral with and surrounding and holding the outer periphery of the diaphragm, said sleeve being provided within said valve chamber, said sleeve having a lengthwise dimension that is substantially parallel to a direction of motion of the diaphragm within the valve chamber, and greater than a corresponding depth of the valve chamber, such that the sleeve is tightly pressed into the valve chamber in a compressed manner, and wherein the sleeve has one or more diametral dimensions substantially parallel to a plane of the diaphragm, at least one of said diametral dimensions being greater than said lengthwise dimension.

12. The liquid dispensing device of claim 11, wherein said valve chamber is operable to allow liquid in the pump chamber to reach the outlet only after a predetermined pressure is established in said pump chamber.

13. The liquid dispensing device system of claim 12, wherein said valve chamber is further operable to stop liquid from reaching the outlet when the pressure in the pump chamber falls below said predetermined pressure.

14. The liquid dispensing device of claim 11, wherein the sleeve includes at least one stabilizing member holding the sleeve substantially fixed as the diaphragm moves.

15. A valve member for use in a valve chamber of a valve system for a liquid dispensing device, said valve member comprising:

an elastic diaphragm stretched around a valve seat normally closing a valve seat opening in a closed state, a first side of said diaphragm facing the valve seat opening and being in fluid communication with the pump chamber and a second side of said diaphragm in communication with atmospheric pressure, wherein said valve member is compressively tensioned in said closed state and is arranged to move away from said valve seat to an open state where it is further compressively tensioned when subjected to at least a predetermined pressure of the liquid, wherein the valve member includes a sleeve integral with and surrounding and holding the outer periphery of the diaphragm, said sleeve being provided within said valve chamber, said sleeve having a lengthwise dimension that is substantially parallel to a direction of motion of the diaphragm within the valve chamber, and greater than a corresponding depth of the valve chamber, such that the sleeve is tightly pressed into the valve chamber in a compressed manner, and wherein the sleeve has one or more diametral dimensions substantially parallel to a plane of the diaphragm, at least one of said diametral dimensions being greater than said lengthwise dimension.

16. The valve member of claim 15, wherein the sleeve includes at least one stabilizing member holding the sleeve substantially fixed as the diaphragm moves.

* * * * *